(12) United States Patent
Imai (10) Patent No.: US 9,994,286 B2
(45) Date of Patent: Jun. 12, 2018

(54) STRADDLE TYPE VEHICLE

(71) Applicant: HONDA MOTOR CO., LTD., Tokyo (JP)

(72) Inventor: Ryoji Imai, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 47 days.

(21) Appl. No.: 15/171,342

(22) Filed: Jun. 2, 2016

(65) Prior Publication Data

US 2016/0375960 A1 Dec. 29, 2016

(30) Foreign Application Priority Data

Jun. 24, 2015 (JP) ................................. 2015-126404

(51) Int. Cl.

| | |
|---|---|
| *B62M 25/08* | (2006.01) |
| *B62K 23/08* | (2006.01) |
| *B62J 23/00* | (2006.01) |
| *B62J 25/00* | (2006.01) |
| *B62K 11/04* | (2006.01) |
| *B62M 25/00* | (2006.01) |
| *B62J 99/00* | (2009.01) |

(52) U.S. Cl.
CPC .............. *B62M 25/08* (2013.01); *B62J 23/00* (2013.01); *B62J 25/00* (2013.01); *B62K 11/04* (2013.01); *B62K 23/08* (2013.01); *B62J 2099/002* (2013.01); *B62M 2025/006* (2013.01)

(58) Field of Classification Search
CPC ...... B62M 25/00; B62M 25/02; B62M 25/06; B62K 23/08; B62J 23/00
See application file for complete search history.

(56) References Cited

U.S. PATENT DOCUMENTS

| | | | | |
|---|---|---|---|---|
| 4,785,626 | A * | 11/1988 | Shiraishi ................. | F02B 27/06 137/595 |
| 4,799,569 | A * | 1/1989 | Hattori ..................... | B62J 35/00 180/219 |
| 6,446,996 | B1 * | 9/2002 | Horii ...................... | B62K 11/04 180/311 |

(Continued)

FOREIGN PATENT DOCUMENTS

| | | |
|---|---|---|
| EP | 2567889 A1 | 3/2013 |
| JP | 2013-071654 A | 4/2013 |

*Primary Examiner* — Joseph M Rocca
*Assistant Examiner* — Michael R Stabley
(74) *Attorney, Agent, or Firm* — Birch, Stewart, Kolasch & Birch, LLP (57) ABSTRACT

A compact shift controller in a straddle type vehicle wherein the layout can be determined more freely, and a rider can mount and dismount the vehicle more easily. In a straddle type vehicle including a body frame; a footrest on which a rider places his/her foot; a shift lever arranged in front of the footrest, and rotated by the rider's operation by foot to shift gears of the vehicle; a shift detection mechanism for detecting operation of the shift lever and an engine supported to the body frame, the footrest is supported to a center frame constituting a part of the body frame below a seat of the rider, and the shift detection mechanism is connected to the shift lever, provided in front of the footrest and the center frame, and is supported to a lower frame constituting a part of the body frame.

15 Claims, 10 Drawing Sheets

(56) References Cited

U.S. PATENT DOCUMENTS

| | | | | |
|---|---|---|---|---|
| 7,055,383 B2* | 6/2006 | Kawakubo | ............ | B62M 25/06 |
| | | | | 73/181 |
| 7,464,954 B2* | 12/2008 | Grow | ............ | B62J 23/00 |
| | | | | 280/304.3 |
| 7,575,083 B2* | 8/2009 | Kosugi | ............ | B62K 11/04 |
| | | | | 180/219 |
| 7,823,472 B2* | 11/2010 | Kosugi | ............ | B62M 25/02 |
| | | | | 74/335 |
| 8,365,856 B2* | 2/2013 | Kashiwai | ............ | F16H 63/30 |
| | | | | 180/230 |
| 8,371,412 B2* | 2/2013 | Sato | ............ | B62M 25/06 |
| | | | | 180/219 |
| 8,403,093 B2* | 3/2013 | Kosugi | ............ | B62M 25/06 |
| | | | | 180/230 |
| 8,408,086 B2* | 4/2013 | Takeuchi | ............ | F16D 1/0858 |
| | | | | 74/335 |
| 8,678,125 B2* | 3/2014 | Kosugi | ............ | B62M 25/06 |
| | | | | 180/230 |
| 8,689,923 B2* | 4/2014 | Kishikawa | ............ | B62H 1/02 |
| | | | | 180/219 |
| 9,022,163 B2* | 5/2015 | Nakamura | ............ | B62M 25/06 |
| | | | | 180/336 |
| 2007/0251747 A1* | 11/2007 | Kosugi | ............ | B62K 11/04 |
| | | | | 180/230 |
| 2008/0125285 A1* | 5/2008 | Takeuchi | ............ | B60W 10/02 |
| | | | | 477/79 |
| 2008/0149409 A1* | 6/2008 | Watanabe | ............ | B60W 10/02 |
| | | | | 180/219 |
| 2010/0212448 A1* | 8/2010 | Sato | ............ | B62M 25/06 |
| | | | | 74/473.16 |
| 2013/0055841 A1* | 3/2013 | Nakamura | ............ | B62M 25/06 |
| | | | | 74/473.16 |

* cited by examiner

STRADDLE TYPE VEHICLE

CROSS-REFERENCE TO RELATED APPLICATIONS

The present application claims priority under 35 USC 119 to Japanese Patent Application No. 2015-126404 filed Jun. 24, 2015 the entire contents of which are hereby incorporated by reference.

BACKGROUND OF THE INVENTION

1. Field of the Invention

The present invention relates to a straddle type vehicle.

2. Description of Background of the Invention

A shift controller for a straddle type vehicle is known wherein a shift detection mechanism for detecting shift operations detects, through a link, shift operations of an operation pedal operated by the foot of a rider. See, for example, Japanese Patent Application Publication No. 2013-71654.

However, in the above conventional straddle type vehicle, installation of the link enlarges the shift controller positioned in the vicinity of the rider's foot, and therefore the shift controller affects the surrounding space. This leads to a problem wherein the freedom in layout, and the ease of mounting and dismounting of the rider is limited.

SUMMARY AND OBJECTS OF THE INVENTION

The present invention has been made in view of the foregoing, and aims to provide a compact shift controller in a straddle type vehicle, so that layout can be determined more freely, and the rider can mount and dismount the vehicle more easily.

To achieve the above objective, according to an embodiment of the present invention, a straddle type vehicle includes a body frame (F); a footrest (47) on which a rider places his/her foot; a shift lever (70) arranged in front of the footrest (47), and rotated by the rider's operation by foot to shift gears of the vehicle; a shift detection mechanism (76) for detecting operation of the shift lever (70) and a power unit (10) supported to the body frame (F). The footrest (47) is supported to a center frame (15L) constituting a part of the body frame (F) below a seat (5) of the rider and the shift detection mechanism (76) is connected to the shift lever (70), provided in front of the footrest (47) and the center frame (15L), and is supported to a front frame (17L) constituting a part of the body frame (F).

According to an embodiment of the present invention, the footrest is supported to the center frame constituting a part of the body frame below the seat of the rider, and the shift detection mechanism is connected to the shift lever, and is supported to the front frame in front of the footrest and the center frame. The shift detection mechanism can be connected to the shift lever, while being provided compactly on the front frame, which is provided in front of the footrest and the center frame and constitutes a part of the body frame. Thus, the layout can be determined more freely, and the rider can mount and dismount the vehicle more easily.

According to an embodiment of the present invention, a rotary shaft (83) of the shift lever (70) is oriented in the longitudinal direction of the vehicle.

According to an embodiment of the present invention, since the rotary shaft of the shift lever is oriented in the longitudinal direction of the vehicle, the longer direction of the shift detection mechanism can be aligned with the longitudinal direction of the vehicle. Thus, the shift detection mechanism can be downsized in the vehicle width direction.

According to an embodiment of the present invention, a skid plate (41) for protecting the power unit (10) from dust scattered from a front wheel (2) is provided, in such a manner so as to cover the lower faces of the power unit (10) and the body frame (F). In addition; the skid plate (41) overlaps with the shift detection mechanism (76) in a bottom view.

According to an embodiment of the present invention, the shift detection mechanism can be protected by the skid plate overlapping with the shift detection mechanism.

According to an embodiment of the present invention, the shift lever (70) extends outwardly in the vehicle width direction from a connection part (94f) with the shift detection mechanism (76), and then extends rearwardly toward the footrest (47). A protector (78) for protecting the shift detection mechanism (76) is arranged between the shift lever (70) and the shift detection mechanism (76).

According to an embodiment of the present invention, the protector for protecting the shift detection mechanism is arranged between the shift lever, which extends rearwardly toward the footrest, and the shift detection mechanism. Thus, even in a configuration where the shift detection mechanism is compactly provided on the front frame, the shift lever can be extended rearwardly toward the footrest to be arranged in an easily operable position, and the protector can be arranged by utilizing the space between the shift lever and the shift detection mechanism, to protect the shift detection mechanism protected with a compact structure.

According to an embodiment of the present invention, the shift detection mechanism (76) is arranged below a sprocket cover (60) covering a drive sprocket (57) connected to an output shaft (56) of the power unit (10), below an alternator cover (67) covering an alternator (69) that generates electric power inside the power unit (10), above the front frame (17L), and on the side of a lower part of a crankcase (51) of the power unit (10).

According to an embodiment of the present invention, the shift detection mechanism is arranged below the sprocket cover, below the alternator cover, above the front frame, and on the side of the lower part of the crankcase of the power unit. Thus, the shift detection mechanism can be arranged such that it is compact in the vehicle width direction, by utilizing the space below the sprocket cover, below the alternator cover, above the front frame, and on the side of the lower part of the crankcase of the power unit.

According to an embodiment of the present invention, the shift detection mechanism (76) is positioned on the inner side in the vehicle width direction of the alternator cover (67) in front view.

According to an embodiment of the present invention, since the shift detection mechanism is positioned on the inner side in the vehicle width direction of the alternator cover in front view, the shift detection mechanism can be protected by the alternator cover.

According to an embodiment of the present invention, the shift detection mechanism (76) is positioned on the inner side in the vehicle width direction of the skid plate (41) in front view.

According to an embodiment of the present invention, since the shift detection mechanism is positioned on the inner side in the vehicle width direction of the skid plate in front view, the shift detection mechanism can be protected by the skid plate.

With the straddle type vehicle of the present invention, layout can be determined more freely, and the rider can mount and dismount the vehicle more easily.

According to an embodiment of the present invention, the shift detection mechanism can be downsized in the vehicle width direction.

According to an embodiment of the present invention, the shift detection mechanism can be protected by the skid plate.

Moreover, the shift detection mechanism can be protected with a compact structure, by use of the protector arranged between the shift lever and the shift detection mechanism.

According to an embodiment of the present invention, the shift detection mechanism can be arranged such that it is compact in the vehicle width direction, below the sprocket cover, below the alternator cover, and on the side of the lower part of the crankcase of the power unit.

According to an embodiment of the present invention, the shift detection mechanism can be protected by the alternator cover.

According to an embodiment of the present invention, the shift detection mechanism can be protected by the skid plate.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
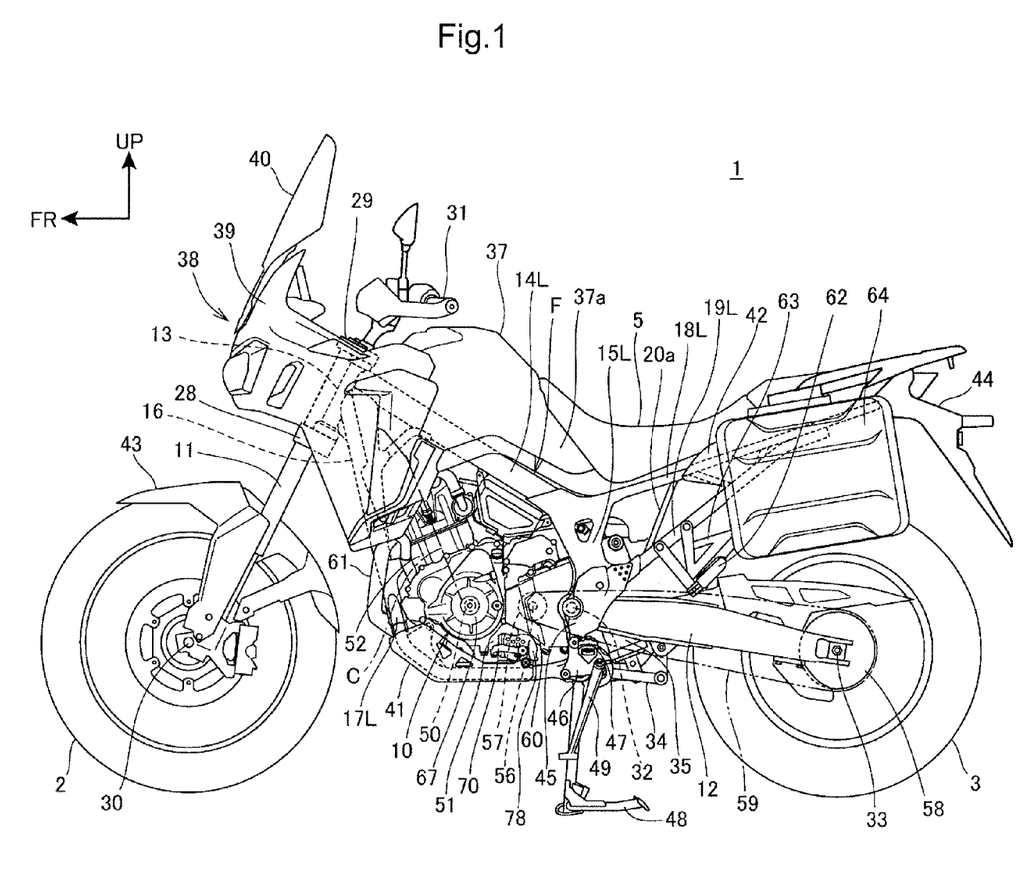
FIG. 1 is a left side view of a motorcycle of an embodiment of the present invention.

FIG. 1 is a left side view of a motorcycle of an embodiment of the present invention. Note that as for parts provided in a left and right pair, those provided on the right side of the vehicle are not shown in the left side view of FIG. 1.

A motorcycle 1 is a vehicle in which an engine 10 (power unit) as a power unit is supported to a body frame F, paired left and right front forks 11, 11 supporting a front wheel 2 are steerably supported to the front end of the body frame F, and a swing arm 12 supporting a rear wheel 3 is provided on the rear side of the body frame F. The motorcycle 1 is a straddle type vehicle having a seat 5, on which a rider sits in a straddling manner, above the longitudinal center of the body frame F.

Figure 2:
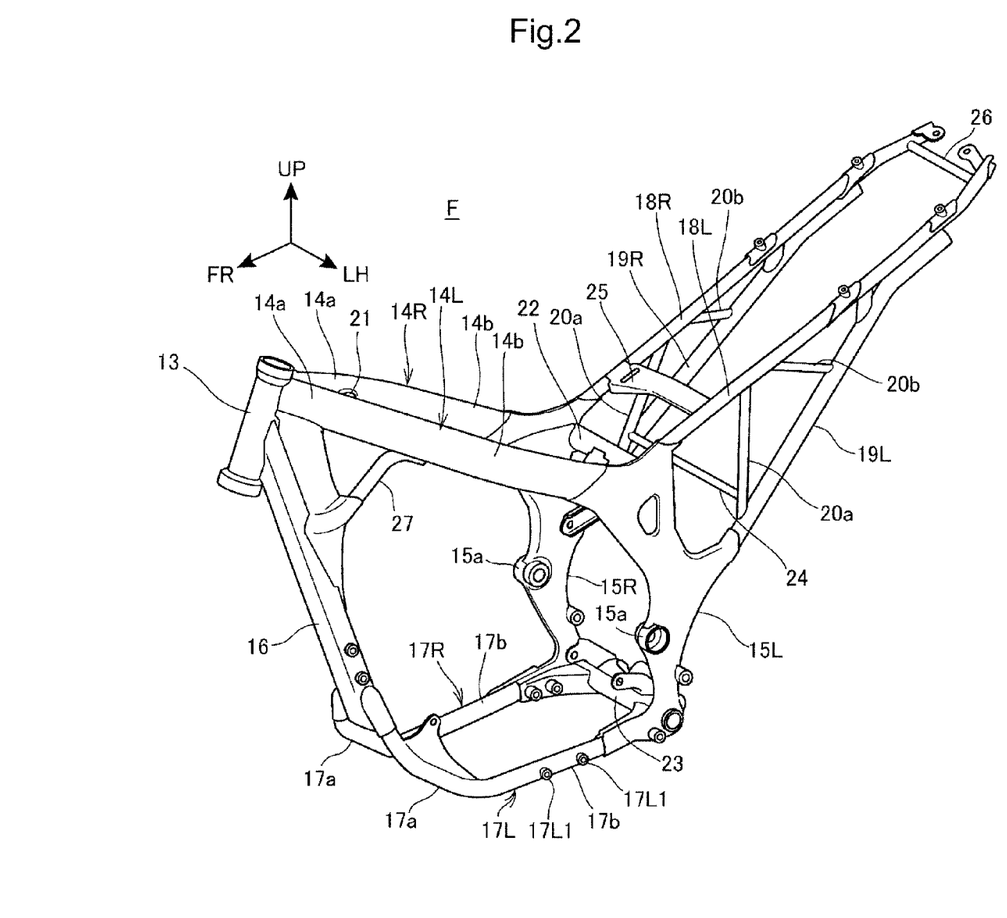
FIG. 2 is a perspective view of a body frame.

FIG. 2 is a perspective view of the body frame F.

As shown in FIGS. 1 and 2, the body frame F includes a head pipe 13 provided at the front end; paired left and right main frames 14L, 14R extending obliquely downwardly to the rear from the head pipe 13; paired left and right center frames 15L, 15R extending downwardly from the respective rear ends of the main frames 14L, 14R; a single down frame 16 extending in the rear lower direction from a lower part of the head pipe 13 and paired left and right lower frames 17L, 17R (front frame) bifurcating to the left and right to extend rearwardly from the lower end of the down frame 16, and connected to the lower ends of the center frames 15L, 15R.

The body frame F also includes paired left and right seat frames 18L, 18R extending in the rear upper direction to a rear end part of the vehicle, from upper rear parts of the center frames 15L, 15R; paired left and right sub frames 19L, 19R extending in the rear upper direction from rear parts of the vertical center of the center frames 15L, 15R, and connected to rear parts of the seat frames 18L, 18R and multiple connection frames 20a, 20b vertically connecting the seat frames 18L, 18R and the sub frames 19L, 19R in a truss-like structure.

The body frame F includes a front cross member 21 connecting front parts of the main frames 14L, 14R in the vehicle width direction; an upper cross member 22 connecting upper parts of the center frames 15L, 15R in the vehicle width direction; a lower cross member 23 connecting the lower ends of the center frames 15L, 15R in the vehicle width direction; a rear lower cross member 24 connecting the left and right connection frames 20a, 20a in the vehicle width direction; a rear upper cross member 25 connecting front parts of the seat frames 18L, 18R in the vehicle width direction and a rear end cross member 26 connecting rear end parts of the seat frames 18L, 18R in the vehicle width direction.

The body frame F also includes a stiffener frame 27 laterally connecting the main frames 14L, 14R, and connected to the rear face side of the down frame 16.

More specifically, the main frames 14L, 14R respectively include front parts 14a extending from an upper part of a rear face of the head pipe 13, and separating farther apart from each other in the vehicle width direction toward the rear and rear parts 14b extending from rear ends of the front parts 14a, coming closer to each other in the vehicle width direction toward the rear, and having rear ends connected to upper parts of the center frames 15L, 15R.

Each of the center frames 15L, 15R is a plate-shaped member whose size is smaller in the vehicle width direction than in the longitudinal direction, and is formed such that its upper part is wider than its lower part in side view.

The center frames 15L, 15R each includes a pivot support hole portion 15a, through which a pivot shaft 32 (FIG. 1) pivotally supporting the swing arm 12 is inserted. Note, that the center frames 15L, 15R not only are frames provided between the front wheel 2 and the rear wheel 3, but also are frames supporting the pivot shaft 32, and therefore are also referred to as pivot frames.

The pivot support hole portions 15a are provided on the front edge side of the center frames 15L, 15R, below the vertical centers thereof. Also, the pivot support hole portions 15*a* are positioned lower than connection parts between the front end of the sub frames 19L, 19R and the center frames 15L, 15R.

The down frame 16 extends downwardly as a single part, from a lower part of the rear face of the head pipe 13.

The lower frames 17L, 17R respectively include rear lower extension portions 17*a* extending in the rear lower direction from a lower end part of the down frame 16, and separating farther apart from each other in the vehicle width direction toward the rear and horizontal portions 17*b* extending horizontally rearwardly from the rear ends of the rear lower extension portions 17*a*, and connected to the lower ends of the center frames 15L, 15R.

A steering shaft (not shown) is pivotally supported to the head pipe 13 in a rotatable manner, and a bottom bridge 28 and top bridge 29 extending in the vehicle width direction are fixed to a lower end part and an upper end part of the steering shaft, respectively. The front forks 11, 11 are supported to the bottom bridge 28 and the top bridge 29, while the front wheel 2 is pivotally supported to a front wheel-axle 30, which is provided at the lower ends of the front forks 11, 11. The rider steers the front wheel 2 through a handle bar 31, which is fixed to the top bridge 29.

The swing arm 12 has a front end part arranged between the left and right pivot support hole portions 15*a*, 15*a*. The swing arm 12 has the front end part, which is pivotally supported to the pivot shaft 32 connecting the left and right center frames 15L, 15R, and swings vertically around the pivot shaft 32. The rear wheel 3 is pivotally supported to a rear wheel-axle 33, which is inserted through a rear end part of the swing arm 12.

A link member 34 for connecting a front part of the swing arm 12 and the lower cross member 23 side, is connected to the swing arm 12. The lower end of a rear suspension 35 is connected to the link member 34. The upper end of the rear suspension 35 is connected to the upper cross member 22.

A fuel tank 37 is provided above the main frames 14L, 14R. The seat 5 is supported on the seat frames 18L, 18R, and extends rearwardly to be continuous with a rear part of the fuel tank 37.

A body cover 38 includes a front cover 39 covering the periphery of the head pipe 13 from the front and the side; a front screen 40 extending upwardly from the upper edge of a front face of the front cover 39; a skid plate 41 covering the lower frames 17L, 17R and the engine 10 from below and a rear cover 42 covering the seat frames 18L, 18R and the sub frames 19L, 19R from the side. A front fender 43 is provided on the front forks 11, 11. A rear fender 44 is provided in a rear end part of the body frame F.

Plate-shaped frame covers 45, 45, which cover lower parts of the center frames 15L, 15R including the pivot support hole portions 15*a* from outer sides, are attached to the center frames 15L, 15R.

Plate-shaped footrest holders 46, 46 are attached below the frame covers 45, 45, on outer faces of lower parts of the center frames 15L, 15R. Paired left and right footrests 47, 47, on which the rider places his/her left and right feet, are attached to the footrest holders 46, 46 and supported to the center frames 15L, 15R.

A main stand 48 is attached to the lower cross member 23. A side stand 49 is attached to a lower part of the left footrest holder 46.

The engine 10 is a water-cooled parallel multi-cylinder engine. The engine 10 includes a crankcase portion 51 (crankcase) supporting a crankshaft 50, which extends in the vehicle width direction, and a cylinder portion 52 extending upwardly from a front upper face of the crankcase portion 51. The crankshaft 50 is accommodated in a front part of the crankcase portion 51.

The engine 10 is an engine in which a cylinder axis C of the cylinder portion 52 is inclined slightly frontward, relative to the vertical direction. The cylinder axis C is inclined farther toward the front than the down frame 16.

A transmission for shifting the power of the crankshaft 50 and outputting it to the rear wheel 3 side, is integrated inside a rear part of the crankcase portion 51. An output shaft 56 of the transmission protrudes to the left outer side from a rear side face of the crankcase portion 51, and a drive sprocket 57 is fixed to the shaft end of the output shaft 56. A drive chain 59, which is wound around the drive sprocket 57 and a driven sprocket 58 of the rear wheel 3, transmits output of the engine 10 to the rear wheel 3. A sprocket cover 60 attached to the crankcase portion 51 covers the drive sprocket 57, from the side.

An unillustrated sealing member is provided on the inner side of the sprocket cover 60, so that lubricating oil applied to the drive chain 59 can be kept from splashing to a later-described shift detection mechanism 76.

An intake system (not shown) of the engine 10 is arranged between the engine 10 and the fuel tank 37.

An exhaust pipe 61 is drawn in the front lower direction from exhaust ports on front faces of cylinders of the cylinder portion 52, then curves to the right side, and extends rearwardly while passing the outer side of a lower part of a right side part of the engine 10. The rear end of the exhaust pipe 61 is connected to a muffler (not shown), which is arranged on the right side of the rear wheel 3.

Paired left and right pillion steps 62, 62, on which a passenger seated on a rear part of the seat 5 places his/her feet, are supported to stays 63, 63 attached to the sub frames 19L, 19R.

Side cases 64, 64 for storing articles are provided on left and right sides of a rear part of the motorcycle 1, respectively.

A shift lever 70 (also referred to as a shift pedal), which the rider operates when shifting the aforementioned transmission of the engine 10, is provided in front of the left footrest 47.

Figure 3:
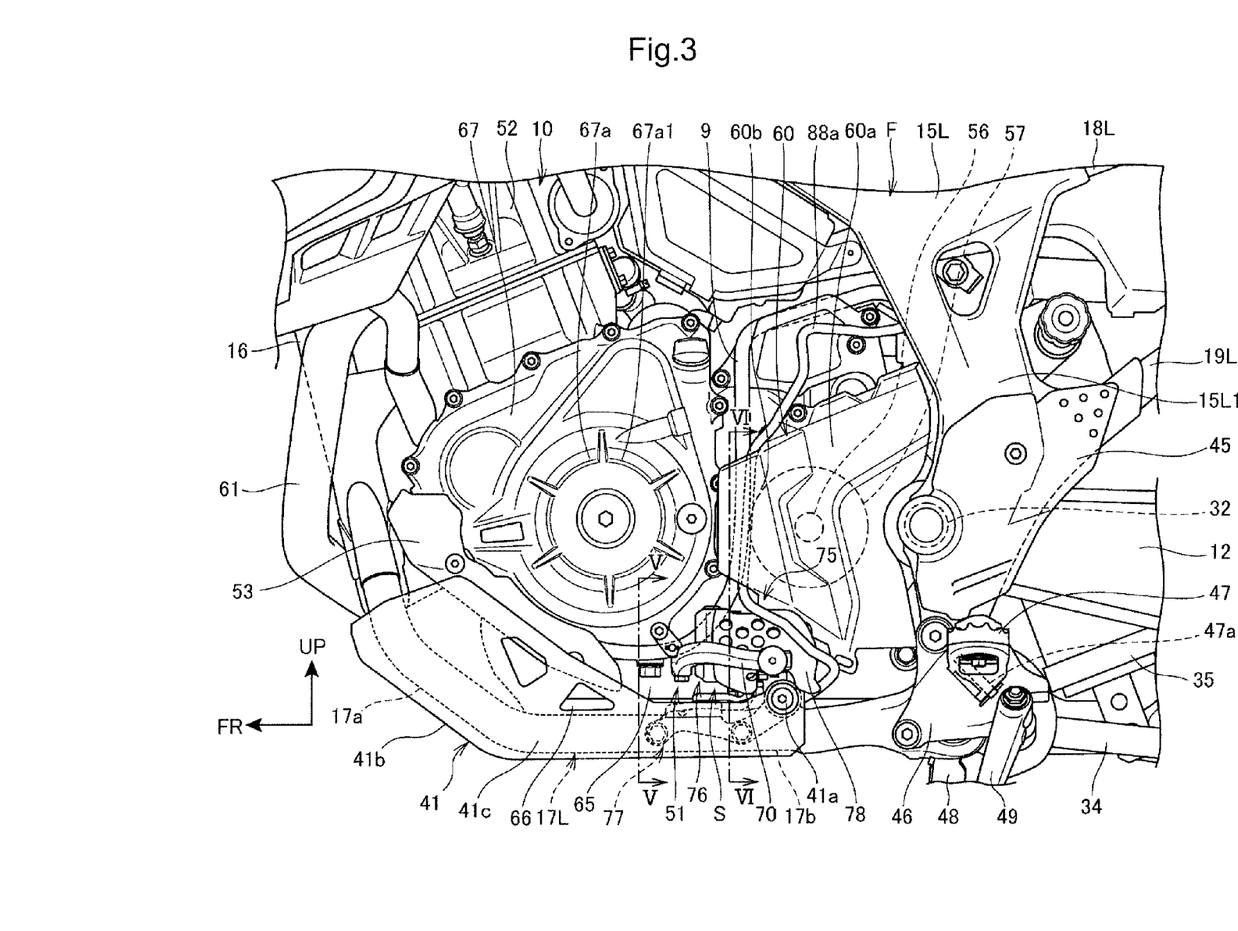
FIG. 3 is a left side view, in which the periphery of a shift lever and a footrest is enlarged.
Figure 4:
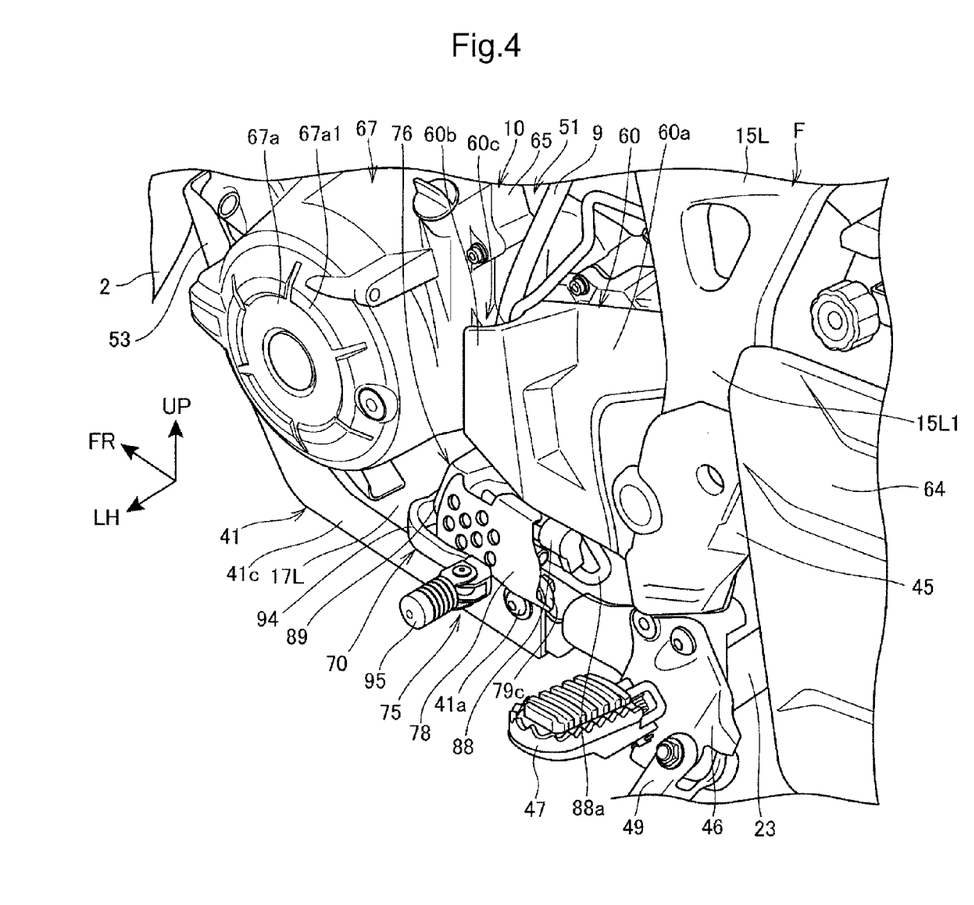
FIG. 4 is a perspective view of the periphery of the shift lever and the footrest, as viewed from the left rear side.
Figure 5:
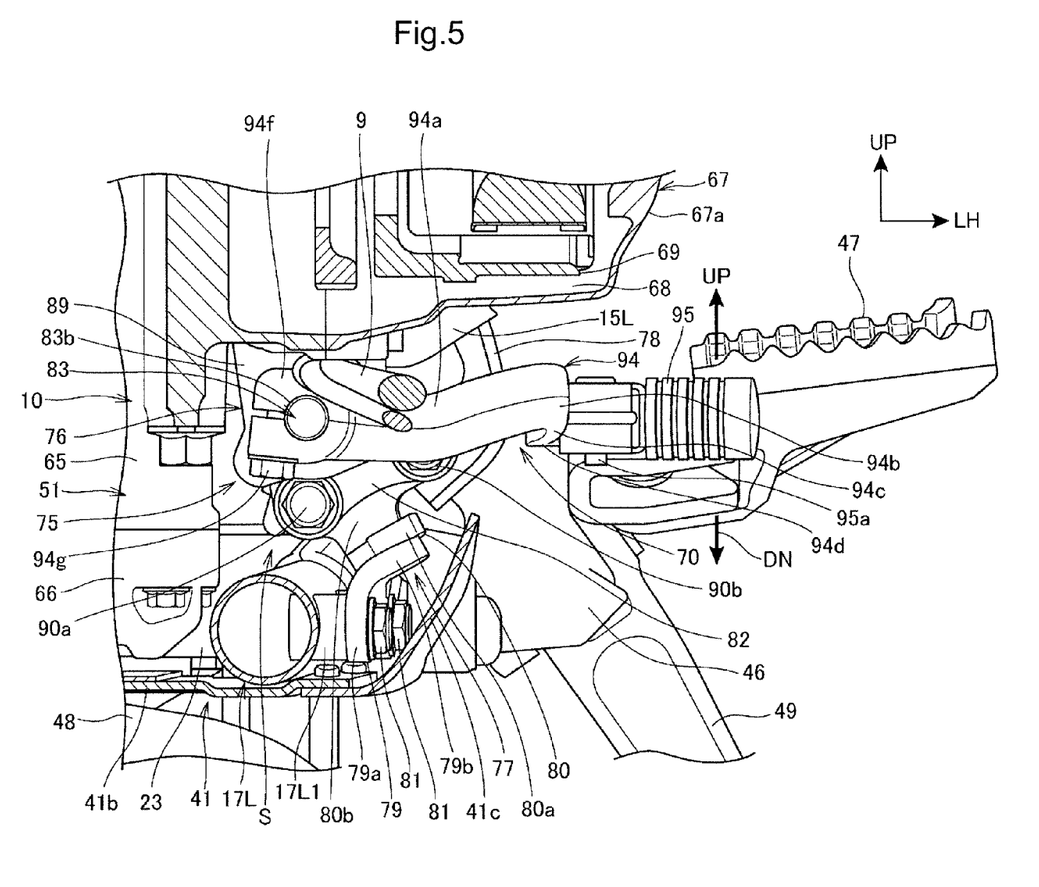
FIG. 5 is a cross-sectional view taken along V-V of FIG. 3.

FIG. 3 is a left side view, in which the periphery of the shift lever 70 and the footrest 47 is enlarged. FIG. 4 is a perspective view of the periphery of the shift lever 70 and the footrest 47, as viewed from the left rear side. FIG. 5 is a cross-sectional view taken along V-V of FIG. 3.

As shown in FIGS. 3 to 5, the crankcase portion 51 includes a case-shaped crankcase main body 65 supporting the crankshaft 50; an oil pan 66 connected to a lower face of the crankcase main body 65 and bulging downward and an alternator cover 67 connected to a left side face of the crankcase main body 65.

A generator room 68 is formed by combining an outer side face part of the crankcase main body 65 and the alternator cover 67. An alternator 69 as a generator is provided on an end part of the crankshaft 50, which extends inside the generator room 68.

The alternator cover 67 includes a cover bulging portion 67*a*, which bulges outwardly in the vehicle width direction in a bottomed cylindrical shape, to follow the outer shape of the alternator 69. The cover bulging portion 67*a* bulges farther outwardly in the vehicle width direction than an outer side face 15L1 of the center frame 15L, on which the footrest holder 46 is attached.

The oil pan 66 overlaps with the lower frames 17L, 17R in side view, and is positioned between the left and right lower frames 17L, 17R.

Figure 6:
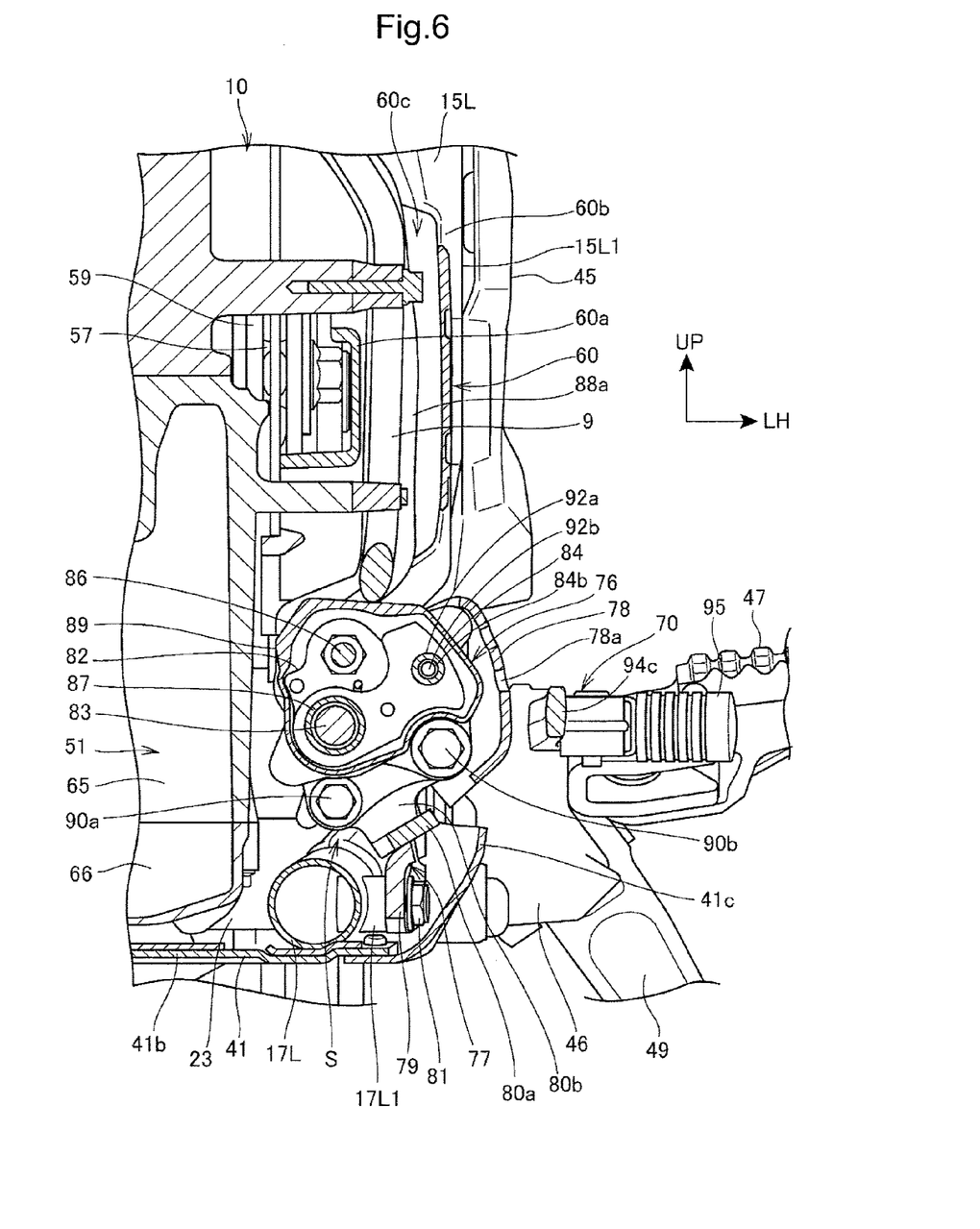
FIG. 6 is a cross-sectional view taken along VI-VI of FIG. 3.

FIG. 6 is a cross-sectional view taken along VI-VI of FIG. 3.

As shown in FIGS. 3, 4, and 6, the sprocket cover 60 includes a cover main body portion 60a covering the drive sprocket 57 (FIG. 1) from the outer side; a side bulging portion 60b raised outward in the vehicle width direction from an outer side face of a front part of the cover main body portion 60a, and then extending to the front and a wiring passage portion 60c, through which wiring 9 drawn upwardly from a lower side of the engine 10 passes. The wiring passage portion 60c is a space formed between the side bulging portion 60b, and a front end part of the cover main body portion 60a.

The sprocket cover 60 is positioned between the alternator cover 67 and the center frame 15L, in the longitudinal direction. An outer side face of the side bulging portion 60b of the sprocket cover 60 is in substantially the same position as the outer side face 15L1 (FIG. 6) of the center frame 15L in the vehicle width direction, and is positioned on the inner side in the vehicle width direction of an outer side face 67a1 of the cover bulging portion 67a.

The alternator cover 67 and the sprocket cover 60 bulge farther outwardly in the vehicle width direction than an outer side face part of the crankcase main body 65, above the lower frame 17L (front frame). A space S, whose upper part is covered with a rear part of the alternator cover 67 and a front part of the sprocket cover 60, and lower part is covered with the lower frame 17L, is formed on the outer side of a lower part of the crankcase main body 65. The lower frame 17L is a front frame positioned in front of the center frame 15L.

Figure 7:
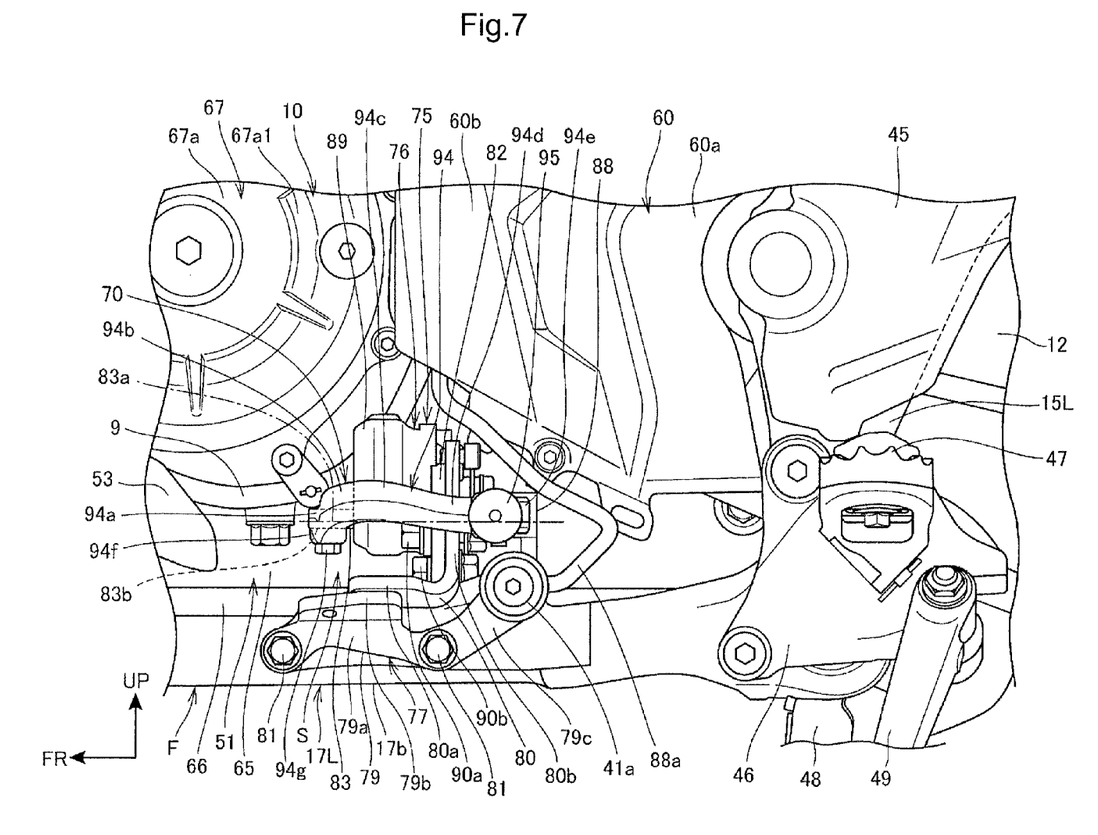
FIG. 7 is a left side view of the periphery of the shift lever and the footrest, in a state where a skid plate is detached.

FIG. 7 is a left side view of the periphery of the shift lever 70 and the footrest 47, in a state where the skid plate 41 is detached. Note that a later-described protector 78 is not shown in FIG. 7.

Referring to FIGS. 3 to 7, the motorcycle 1 includes a shift controller 75 for controlling shifting of the transmission of the engine 10.

The shift controller 75 includes the shift lever 70; the shift detection mechanism 76 for detecting operations of the shift lever 70; a shift actuator (not shown) for rotating a shift drum (not shown) of the transmission to shift gears; a controller (not shown) for driving the above shift actuator, based on the detection result of the shift detection mechanism 76; a stay 77 that supports the shift detection mechanism 76 to the body frame F and the protector 78 that covers the shift detection mechanism 76 from the outer side.

The above transmission is a constant mesh type, in which transmission gears constituting the speeds are constantly meshed with one another, and an arbitrary speed is established by moving a transmission gear with a shift fork, which slides along a shift groove on the outer periphery of the above shift drum. A motor or hydraulic actuator, for example, may be used as the above shift actuator.

More specifically, in the embodiment, the shift lever 70 functions as a shift switch into which the rider's shift operation is inputted, and when the above controller detects the shift operation by the shift detection mechanism 76, the gears are shifted automatically by the power of the above shift actuator.

The shift lever 70 and the shift detection mechanism 76 are arranged in the space S, in front of the left footrest 47.

The stay 77 of the shift controller 75 includes a frame fixing portion 79 fixed on an outer side face of the lower frame 17L below the space S, and a support portion 80 extending upwardly from the frame fixing portion 79 to support the shift detection mechanism 76.

More specifically, the frame fixing portion 79 of the stay 77 includes a side plate portion 79a extending longitudinally along the outer side face of a rear part of the lower frame 17L and an upper plate portion 79b curving from the upper edge of the side plate portion 79a, and extending outward in the vehicle width direction. The side plate portion 79a is fixed to paired boss portions 17L1, 17L1 (FIG. 5), which are provided side by side in the longitudinal direction on the outer side face of the lower frame 17L, with bolts 81, 81 fastened from the outer side in the vehicle width direction. The frame fixing portion 79 also includes a rear extension portion 79c extending farther to the rear than the rear bolt 81. A rear end part of the skid plate 41 is fixed to a rear end part of the rear extension portion 79c, with a bolt 41a (FIG. 3).

The support portion 80 of the stay 77 includes a plate-shaped joint portion 80a joined to an upper face of the upper plate portion 79b and extending rearward, and a support plate portion 80b curving at the rear end of the joint portion 80a and extending upward. The support plate portion 80b is a plate that extends vertically in the space S, and whose thickness direction is oriented in the longitudinal direction of the vehicle.

Figure 8:
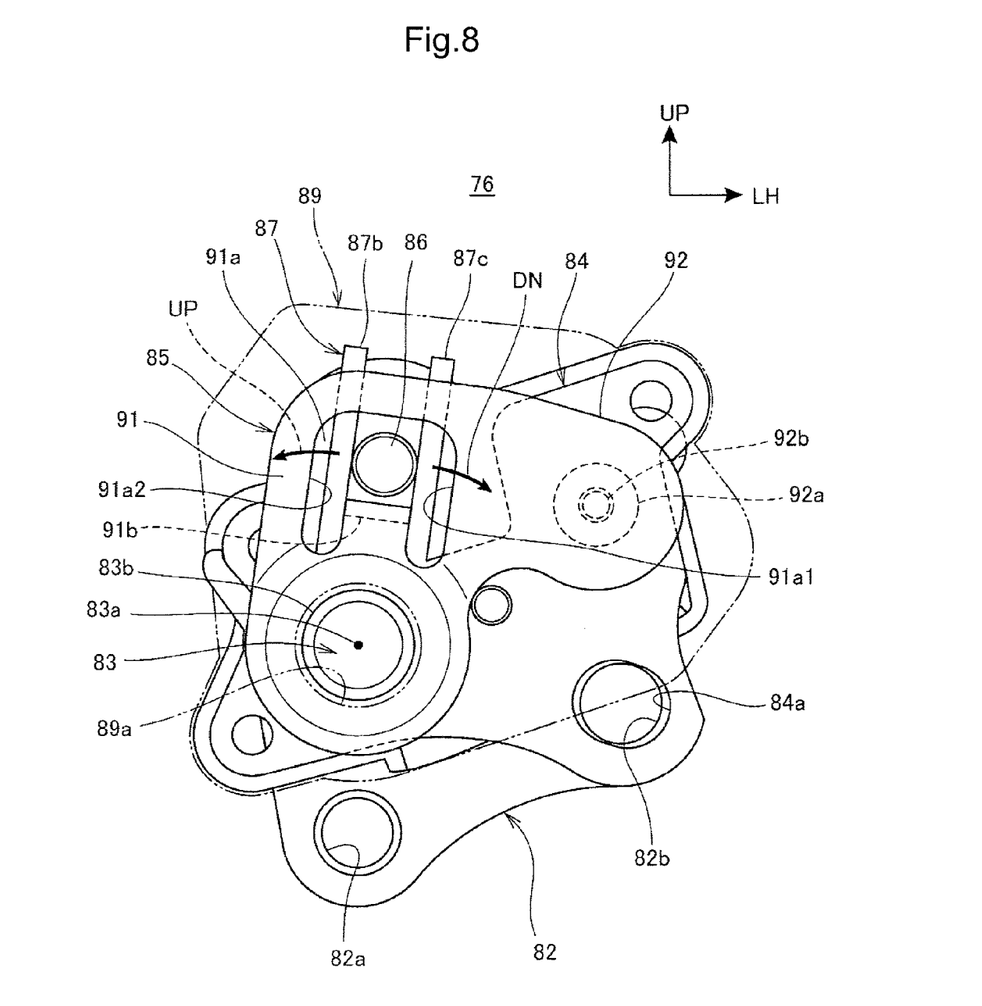
FIG. 8 is a front view of a shift detection mechanism, as viewed from the front side.
Figure 9:
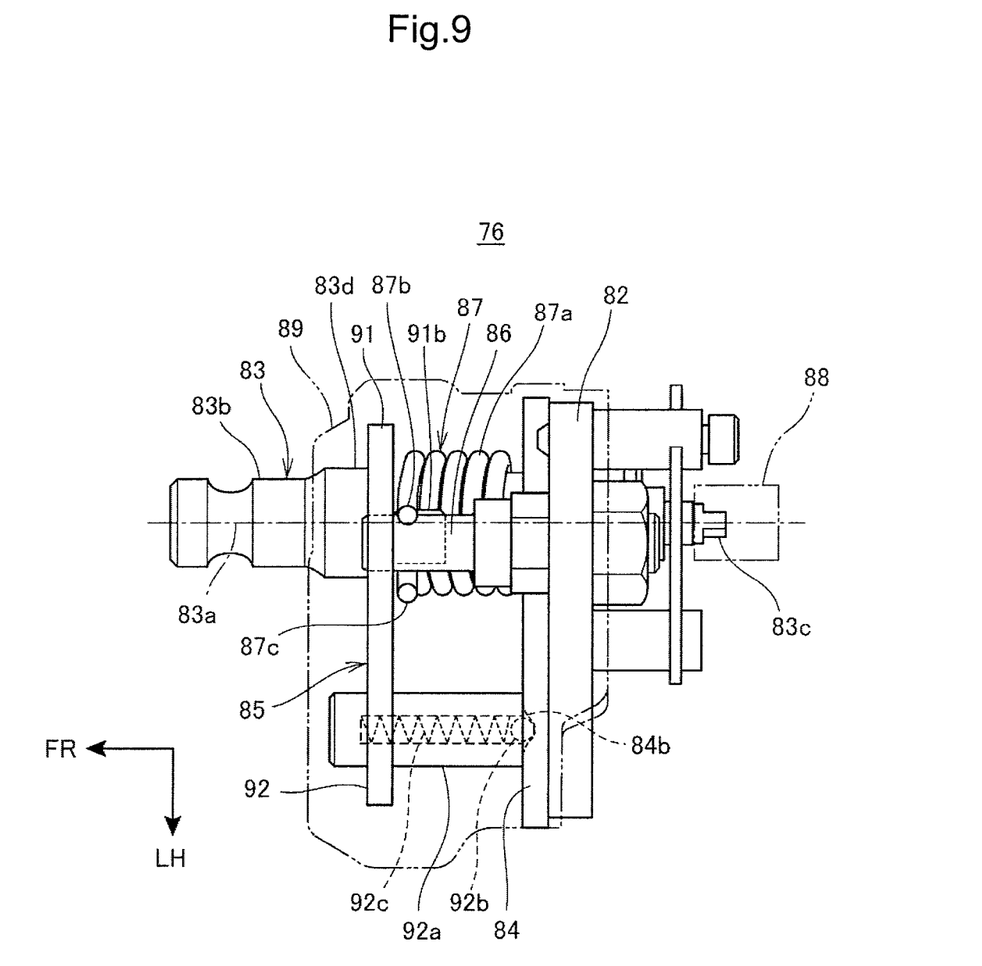
FIG. 9 is a plan view of the shift detection mechanism, as viewed from above.

FIG. 8 is a front view of the shift detection mechanism 76, as viewed from the front side. FIG. 9 is a plan view of the shift detection mechanism 76, as viewed from above. FIGS. 8 and 9 show the shift detection mechanism 76 in a neutral state, when no shift operation is made.

Referring to FIGS. 4 to 9, the shift detection mechanism 76 includes a base plate 82 fixed to a front face of the support plate portion 80b of the stay 77, a shift lever rotary shaft 83 whose axis 83a is oriented in the longitudinal direction of the vehicle, and a click plate 84 fixed to a front face of the base plate 82.

The shift detection mechanism 76 also includes an arm 85 fixed to the shift lever rotary shaft 83, and rotating integrally with the shift lever rotary shaft 83; a stopper pin 86 provided parallel to the shift lever rotary shaft 83, in a standing manner on the front face of the base plate 82; a return spring 87 interposed between the stopper pin 86 and the arm 85; a sensor 88 for detecting the rotation amount of the shift lever rotary shaft 83 and a casing 89 covering the arm 85, click plate 84 and other parts, from the front.

More specifically, the base plate 82 has fixing holes 82a, 82b on the inner side and outer side in the vehicle width direction in a lower part thereof, and is fixed to the front face of the support plate portion 80b of the stay 77, with bolts 90a, 90b inserted into the fixing holes 82a, 82b.

The base plate 82 has a support hole part (not shown) rotatably supporting the shift lever rotary shaft 83, in a part above the fixing hole 82a closer to the inner side in the vehicle width direction. The base plate 82 also has the stopper pin 86 above the shift lever rotary shaft 83.

The shift lever rotary shaft 83 is a shaft that penetrates the base plate 82 and extends straight in the longitudinal direction. The shift lever rotary shaft has a longitudinal center part pivotally supported to the base plate 82, and its front end part and rear end part are positioned at the front and rear of the base plate 82, respectively. The shift lever rotary shaft 83 extends parallel to the centerline of the motorcycle 1 in the vehicle width direction, in the longitudinal direction.

The shift lever rotary shaft 83 has, in its front end part, a shift lever fixing portion 83b to which the shift lever 70 is fixed and has, in its rear end part, a sensor connection portion 83c to which the sensor 88 is connected. The shift lever rotary shaft 83 also has, in its front part and behind the shift lever fixing portion 83b, an arm fixing portion 83d (FIG. 9) to which the arm 85 is fixed.

The arm 85 includes an arm main body portion 91 extending upwardly to the stopper pin 86 side from the shift lever rotary shaft 83, and a click arm portion 92 extending outwardly in the vehicle width direction from an upper part of the arm main body portion 91.

The arm main body portion 91 includes a substantially rectangular position limitation opening 91a, into which the stopper pin 86 is inserted. The width of the position limitation opening 91a is formed larger than the diameter of the stopper pin 86, so that the arm main body portion 91 can rotate within a predetermined range around the shift lever rotary shaft 83.

The arm main body portion 91 also includes a return spring locking portion 91b that extends toward the stopper pin 86 side from the lower edge of the position limitation opening 91a, and then extends while curving toward the base plate 82 side.

The click arm portion 92 of the arm 85 includes a ball support tube 92a that extends toward the click plate 84 side, from an end part of the click arm portion 92 on the outer side in the vehicle width direction. The ball support tube 92a includes a ball 92b provided inside the ball support tube 92a, and a ball energizing spring 92c that energizes the ball 92b toward the click plate 84 side.

The return spring 87 is a helical torsion coil spring, and is arranged between the click plate 84 and the arm main body portion 91, with a coil portion 87a fitted to an outer periphery part of the shift lever rotary shaft 83. The return spring 87 has one end 87b and the other end 87c, which extend radially outwardly and are provided substantially parallel to each other, with a predetermined gap in between.

The return spring 87 is arranged such that the one end 87b and the other end 87c sandwich the stopper pin 86. In addition, the return spring locking portion 91b of the arm main body portion 91 is sandwiched between the one end 87b and the other end 87c, in a position closer to the shift lever rotary shaft 83 side than the stopper pin 86.

Energizing force of the return spring 87 is transmitted to the shift lever rotary shaft 83, through the arm 85 fixed integrally with the shift lever rotary shaft 83 wherein the return spring 87 energizes the shift lever rotary shaft 83 to a neutral position, through the arm 85.

The click plate 84 is fixed integrally with the front face of the base plate 82. The click plate 84 has a fixing hole 84a in a lower part thereof, and the fixing hole 84a is fixed to the base plate 82 by inserting the bolt 90b (FIG. 6) of the base plate 82 thereinto.

The click plate 84 includes a circular concave portion 84b (FIG. 9) into which the ball 92b of the click arm portion 92 fits.

The casing 89 is formed into a box shape having an open rear face. The casing 89 has, in its front face, a through hole 89a through which the shift lever rotary shaft 83 penetrates from the rear. Attaching the base plate 82 closes the rear face of the casing 89. In this way, the arm 85, the return spring 87, the click plate 84, and the stopper pin 86 are accommodated inside the casing 89 and protected.

The sensor 88, for example, may be a potentiometer. Wiring 88a of the sensor 88 passes through behind the shift detection mechanism 76, is drawn upwardly through the wiring passage portion 60c of the sprocket cover 60, and is connected to the aforementioned controller.

Figure 10:
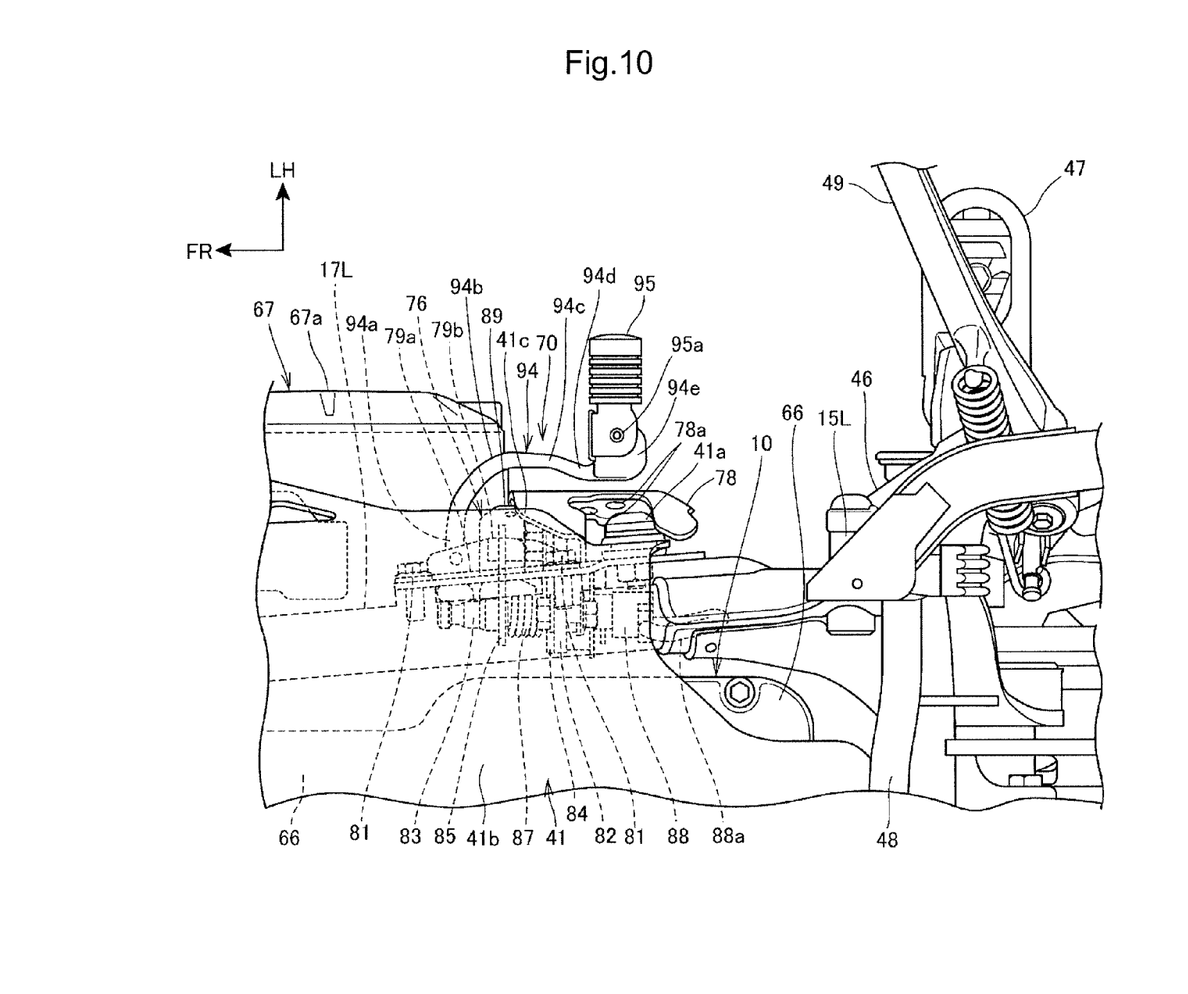
FIG. 10 shows the periphery of the shift lever as viewed from below.

FIG. 10 shows the periphery of the shift lever 70 as viewed from below.

Referring to FIGS. 5, 7, and 10, the shift lever 70 includes a lever main body portion 94 connected to the shift lever rotary shaft 83, and an operation portion 95 rotatably connected to the lever main body portion 94.

The lever main body portion 94 includes an outer side extension portion 94a extending outwardly in the vehicle width direction from the shift lever fixing portion 83b of the shift lever rotary shaft 83, in such a manner so as to be substantially perpendicular to the shift lever rotary shaft 83; a curved portion 94b curving rearwardly in an arc shape from the outer end of the outer side extension portion 94a; a rear extension portion 94c extending rearwardly and parallel to the longitudinal direction of the vehicle, from the rear end of the curved portion 94b; a rear end portion 94d extending rearwardly while curving inwardly in the vehicle width direction, from the rear end of the rear extension portion 94c and an operation part-connection portion 94e extending rearwardly from the rear end portion 94d.

The outer side extension portion 94a includes a fixing hole portion 94f (FIG. 5), through which the shift lever fixing portion 83b is inserted. The fixing hole portion 94f (connection part with shift detection mechanism) is a split clamp type, in which the shift lever fixing portion 83b is clamped, by reducing the inner diameter of the fixing hole portion 94f with a fixing bolt 94g screwed into the fixing hole portion 94f from below. More specifically, the fixing hole portion 94f is spline-fitted to the shift lever fixing portion 83b. Thus, the fixing position of the lever main body portion 94 on the shift lever fixing portion 83b in the rotation direction can be changed to an arbitrary position, by shifting the spline-fitted fixing position in the rotation direction in a stepwise manner.

The operation part-connection portion 94e (FIG. 10) of the lever main body portion 94 protrudes farther outwardly in the vehicle width direction, than an outer side face of the rear extension portion 94c.

The operation portion 95 is a part that the rider operates with his/her foot, and extends outwardly in the vehicle width direction from the operation part-connection portion 94e. The operation portion 95 is positioned on the inner side of the footrest 47 in the vehicle width direction, but is arranged in such manner so as to at least partially overlap with the footrest 47. Thus, the rider's foot is brought closer to the operation portion 95 in the vehicle width direction, and operation is facilitated. The operation portion 95 has a base end part, which is supported by a shaft 95a vertically inserted into the operation part-connection portion 94e, and is rotatable around the shaft 95a. When a large external force is applied on the operation portion 95, the load is eased by rotation of the operation portion 95.

As shown in FIG. 3, the footrest 47 is supported to the footrest holder 46 through a support shaft 47a, which is provided in a frontward-tilted form in side view, and is energized by a spring (not shown) interposed between the footrest holder 46 and the footrest 47, such that an upper face of the footrest is substantially horizontal. The footrest 47 is retractable, and rotates upwardly about the support shaft 47a, when a large external force is applied thereto from below.

More specifically, the shift lever rotary shaft 83 is arranged inside the space S, and as in FIG. 5, is positioned in a similar position as the outer side face of the lower frame 17L in the vehicle width direction, and is positioned lower than the upper face of the footrest 47 in the height direction. The outer side extension portion 94a of the lever main body portion 94 extends to the outside of the space S, from the position described above. Also, as shown in FIG. 7, the shift lever fixing portion 83b of the shift lever rotary shaft 83 and the outer side extension portion 94a are positioned in front of the shift detection mechanism 76, and below a rear part of the alternator cover 67, in the longitudinal direction.

The curved portion 94b and rear extension portion 94c of the lever main body portion 94 are arranged on the inner side in the vehicle width direction of the outer side face 67a1 of the cover bulging portion 67a, and extend rearwardly toward the footrest 47 side while passing the outer side of the shift detection mechanism 76. As shown in FIG. 7, the rear extension portion 94c extends rearwardly such that it overlaps with the axis 83a of the shift lever rotary shaft 83, in a side view.

The operation part-connection portion 94e of the lever main body portion 94 and the operation portion 95 are provided such that they overlap with the sensor 88 in the side view of FIG. 7 to cover the sensor 88 from the outside.

The protector 78 is arranged between the shift detection mechanism 76 and the rear extension portion 94c, rear end portion 94d, and operation part-connection portion 94e, which are the rear part of the lever main body portion 94, and covers the shift detection mechanism 76 from the outer side. The protector 78 includes multiple lightening holes 78a. The protector 78 covers an area from the casing 89 to the sensor 88. By thus providing the protector 78 by utilizing a longitudinally long space formed between the lever main body portion 94, which extends rearwardly toward the footrest 47 side, and the shift detection mechanism 76, the protector 78 can be provided such that it is compact in the vehicle width direction.

As shown in FIGS. 3, 6, and 10, the skid plate 41 covers the left and right lower frames 17L, 17R and the engine 10 from below, and protects the lower frames 17L, 17R and the engine 10 from dust scattered from the front wheel 2. More specifically, the skid plate 41 is provided such that it straddles the left and right lower frames 17L, 17R, and includes a bottom plate portion 41b extending along bottom faces of the lower frames 17L, 17R from front to rear parts thereof and side wall portions 41c, 41c (the right side wall portion is not shown) extending obliquely upwardly to the outer side in the vehicle width direction from left and right side edges of the bottom plate portion 41b, to cover the outer side faces of the lower frames 17L, 17R and an outer side face of a lower part of the engine 10.

A rear part of the left side wall portion 41c of the skid plate 41 extends up to a position close to the lower edge of the protector 78, and covers the stay 77 from the outer side. This hides the stay 77 from the outside, so that a simple and excellent appearance can be achieved.

As shown in FIG. 10, in a bottom view, the rear part of the left side wall portion 41c of the skid plate 41 overlaps with the shift detection mechanism 76 and the outer side extension portion 94a of the shift lever 70, and covers the shift detection mechanism 76 and the outer side extension portion 94a of the shift lever 70 from below. Thus, the shift detection mechanism 76 and the shift lever 70 can be protected with a simple structure, by utilizing the skid plate 41.

As shown in FIGS. 5 and 6, when viewed from the front, the shift detection mechanism 76 is positioned on the inner side in the vehicle width direction of the left side wall portion 41c of the skid plate 41, and the cover bulging portion 67a of the alternator cover 67. Thus, the shift detection mechanism 76 can be protected by the skid plate 41 and the alternator cover 67.

An inner cover 53 is provided between the skid plate 41 and a lower face of a front part of the engine 10.

Referring to FIG. 1, the rider sitting on the seat 5 normally rides the motorcycle 1 with his/her knees pressed against a knee grip portion 37a in a rear part of the fuel tank 37, his/her legs stretched downward along the center frames 15L, 15R, and his/her feet placed on the footrests 47, 47, and operates the shift lever 70 in front of the footrest 47 with his/her foot when shifting gears.

Operations of the shift controller 75 during a shift operation will be described with reference to FIGS. 5 and 8. In FIGS. 5 and 8, arrows indicate a shift-up direction UP and a shift-down direction DN. Also, FIGS. 3 to 10 show the shift detection mechanism 76 in a neutral state.

In the neutral state, the shift lever rotary shaft 83 is energized by the return spring 87 through the arm 85, and the shift lever rotary shaft 83 and the shift lever 70 are in rotation positions indicated in FIGS. 5 and 8.

In addition, in the neutral state, the ball 92b of the arm 85 is fitted into the concave portion 84b (FIG. 9) of the click plate 84.

When the rider operates the shift lever 70 in the shift-up direction UP, the shift lever rotary shaft 83 rotates in the shift-up direction UP, against the energizing force of the return spring 87. In this case, the return spring locking portion 91b of the arm 85 presses apart the one end 87b of the return spring 87, in the shift-up direction UP. Abutment of an outer edge 91a1 of the position limitation opening 91a against the outer periphery of the stopper pin 86, limits the maximum rotation angle of the shift lever rotary shaft 83 in the shift-up direction UP.

Also, the arm 85 rotates in the shift-up direction UP with the shift lever rotary shaft 83, and when shifting up, the ball 92b of the arm 85 separates from the concave portion 84b (FIG. 9) of the click plate 84 against the ball energizing spring 92c. Thus, the rider can feel the force required to separate the ball 92b from the concave portion 84b as a click, whereby the shift operation can be accentuated.

When the sensor 88 detects the rotation of the shift lever rotary shaft 83 in the shift-up direction UP, the controller drives the shift actuator and shifts up the gear.

When the rider stops operating the shift lever 70, the shift lever rotary shaft 83 and the shift lever 70 are brought back to the neutral state by the energizing force of the return spring 87, and the ball 92b fits into the concave portion 84b.

When the rider operates the shift lever 70 in the shift-down direction DN, the shift lever rotary shaft 83 rotates in the shift-down direction DN against the energizing force of the return spring 87. In this case, the return spring locking portion 91b of the arm 85 presses apart the other end 87c of the return spring 87, in the shift-down direction DN. Abutment of an inner edge 91a2 of the position limitation opening 91a against the outer periphery of the stopper pin 86, limits the maximum rotary angle of the shift lever rotary shaft 83 in the shift-down direction DN.

The arm 85 rotates in the shift-down direction DN with the shift lever rotary shaft 83, and when shifting down, the ball 92b of the arm 85 separates from the concave portion 84b (FIG. 9) of the click plate 84 against the ball energizing spring 92c. Thus, the rider can feel the force required to separate the ball 92b from the concave portion 84b as a click, whereby the shift operation can be accentuated.

When the sensor 88 detects the rotation of the shift lever rotary shaft 83 in the shift-down direction DN, the controller drives the shift actuator and shifts down the gear.

When the rider stops operating the shift lever 70, the shift lever rotary shaft 83 and the shift lever 70 are brought back to the neutral state by the energizing force of the return spring 87, and the ball 92b fits into the concave portion 84b.

In the embodiment, the footrest 47 is supported to the center frame 15L, and the shift detection mechanism 76, which includes the shift lever rotary shaft 83 directly connected to the shift lever 70, is supported to the lower frame 17L arranged in front of the center frame 15L. Thus, there is no need to provide a link between the shift lever 70 and the shift detection mechanism 76, and the structure can be downsized. Accordingly, space can be used efficiently, layout can be determined more freely, and the rider can mount and dismount the vehicle more easily because his/her foot is less likely to be blocked by the shift lever 70 and the shift detection mechanism 76.

Also, since the shift lever 70 is provided in the lower frame 17L separately from the footrest 47 of the center frame 15L, layout of the shift lever 70 can be determined more freely.

Since the shift lever rotary shaft 83 is oriented in the longitudinal direction of the vehicle as in FIGS. 7 and 8, the longer direction of the shift detection mechanism 76 can be aligned with the longitudinal direction of the vehicle. Thus, the shift lever rotary shaft 83 does not protrude in the vehicle width direction, and the shift detection mechanism 76 can be downsized in the vehicle width direction. Moreover, if a large external force is applied on the shift lever 70 in the vertical direction, such as when the motorcycle 1 falls to the side, the external force can be relieved by rotation of the shift lever rotary shaft 83, and application of a large load on the shift lever rotary shaft 83 and the shift detection mechanism 76 can be avoided.

As has been described, according to the embodiment to which the present invention is applied, the motorcycle 1 includes the body frame F; the footrest 47 on which the rider places his/her foot; the shift lever 70 arranged in front of the footrest 47, and rotated by the rider's operation by foot to shift gears of the motorcycle 1; the shift detection mechanism 76 for detecting operation of the shift lever 70 and the engine 10 supported to the body frame F. The footrest 47 is supported to the center frame 15L constituting a part of the body frame F below the seat 5 of the rider and the shift detection mechanism 76 is connected to the shift lever 70, provided in front of the footrest 47 and the center frame 15L, and is supported to the lower frame 17L constituting a part of the body frame F. Thus, the shift detection mechanism 76 can be connected to the shift lever 70, while being provided compactly on the lower frame 17L in front of the footrest 47 and the center frame 15L. Thus, layout of the shift lever 70 and the shift detection mechanism 76 can be determined more freely, and the rider can mount and dismount the vehicle more easily.

Since the shift lever rotary shaft 83 is oriented in the longitudinal direction of the vehicle, the longer direction of the shift detection mechanism 76 can be aligned with the longitudinal direction of the vehicle. Thus, the shift detection mechanism 76 can be downsized in the vehicle width direction.

The skid plate 41 for protecting the engine 10 from dust scattered from the front wheel 2 is provided, in such a manner so as to cover the lower faces of the engine 10 and the body frame F, and overlaps with the shift detection mechanism 76 in bottom view. Thus, the shift detection mechanism 76 can be protected by the skid plate 41 overlapping with the shift detection mechanism 76. In addition, since the shift detection mechanism 76 is downsized in the vehicle width direction, the skid plate 41 can also be downsized in the width direction.

Moreover, the shift lever 70 extends outwardly in the vehicle width direction from the fixing hole portion 94*f*, which is the connection part with the shift detection mechanism 76, and then extends rearwardly toward the footrest 47 and the protector 78 for protecting the shift detection mechanism 76 is arranged between the shift lever 70 and the shift detection mechanism 76. Thus, even in a configuration where the shift detection mechanism 76 is compactly provided on the lower frame 17L on the front side of the footrest 47, the shift lever 70 can extend rearwardly toward the footrest 47 to be arranged in an easily operable position, and the protector 78 can be arranged by utilizing the space between the shift lever 70 and the shift detection mechanism 76 in the vehicle width direction, to protect and the shift detection mechanism 76 with a compact structure.

The shift detection mechanism 76 is arranged below the sprocket cover 60 covering the drive sprocket 57 connected to the output shaft 56 of the engine 10, below the alternator cover 67 covering the alternator 69 that generates electric power inside the engine 10, above the lower frame 17L, and on the side of the lower part of the crankcase portion 51 of the engine 10. Thus, the shift detection mechanism 76 can be arranged such that it is compact in the vehicle width direction, by utilizing the space below the sprocket cover 60, below the alternator cover 67, above the lower frame 17L, and on the side of the lower part of the crankcase portion 51 of the engine 10.

Since the shift detection mechanism 76 is positioned on the inner side in the vehicle width direction of the alternator cover 67 in a front view, the shift detection mechanism 76 can be protected by the alternator cover 67.

In addition, since the shift detection mechanism 76 is positioned on the inner side in the vehicle width direction of the skid plate 41 in front view, the shift detection mechanism 76 can be protected by the skid plate 41.

Note that the above embodiment is one aspect to which the present invention is applied, and the invention is not limited to the above embodiment.

Although the above embodiment has been described by using the lower frame 17L as an example of the front frame to which the shift detection mechanism 76 is supported, the present invention is not limited to this. The front frame may be other frames, as long as they are positioned at the front of the footrest and the center frame.

In addition, although the above embodiment has been described by using the engine 10 as an example of the power unit, the invention is not limited to this. The power unit may include an electric motor as a drive source for driving the wheel.

Although the above embodiment has been described by using the motorcycle 1 as an example of the straddle type vehicle, the invention is not limited to this. For example, the invention may be applied to a straddle type vehicle having three or more wheels.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A straddle vehicle comprising:
   a body frame;
   a footrest on which a rider places his/her foot;
   a shift lever arranged in front of the footrest, and rotated by the rider's operation by foot to shift gears of the vehicle;
   a shift detection mechanism for detecting an operation of the shift lever; and a power unit supported to said body frame;
wherein said footrest is supported to a center frame constituting a part of said body frame below a seat of the rider;
said shift detection mechanism is connected to said shift lever, provided in front of said footrest and said center frame, and is supported to a front frame constituting a part of said body frame; and
a rotary shaft of said shift lever is oriented in the longitudinal direction of the vehicle.

2. The straddle vehicle according to claim 1, wherein:
a skid plate for protecting said power unit from dust scattered from a front wheel is provided, in such a manner so as to cover lower faces of said power unit and said body frame; and
said skid plate overlaps with said shift detection mechanism in bottom view.

3. The straddle vehicle according to claim 2, wherein:
said shift lever extends outward in the vehicle width direction from a connection part with said shift detection mechanism, and then extends rearwardly toward said footrest; and
a protector for protecting said shift detection mechanism is arranged between said shift lever and said shift detection mechanism.

4. The straddle vehicle according to claim 2, wherein said shift detection mechanism is arranged:
below a sprocket cover covering a drive sprocket connected to an output shaft of said power unit;
below an alternator cover covering an alternator that generates electric power inside said power unit;
above said front frame; and
on the side of a lower part of a crankcase of said power unit.

5. The straddle vehicle according to claim 2, wherein said shift detection mechanism is positioned on the inner side in the vehicle width direction of said skid plate in front view.

6. The straddle vehicle according to claim 1, wherein:
said shift lever extends outward in the vehicle width direction from a connection part with said shift detection mechanism, and then extends rearwardly toward said footrest; and
a protector for protecting said shift detection mechanism is arranged between said shift lever and said shift detection mechanism.

7. The straddle vehicle according to claim 6, wherein said shift detection mechanism is arranged:
below a sprocket cover covering a drive sprocket connected to an output shaft of said power unit;
below an alternator cover covering an alternator that generates electric power inside said power unit;
above said front frame; and
on the side of a lower part of a crankcase of said power unit.

8. The straddle vehicle according to claim 1, wherein said shift detection mechanism is arranged:
below a sprocket cover covering a drive sprocket connected to an output shaft of said power unit;
below an alternator cover covering an alternator that generates electric power inside said power unit;
above said front frame; and
on the side of a lower part of a crankcase of said power unit.

9. The straddle vehicle according to claim 8, wherein said shift detection mechanism is positioned on the inner side in the vehicle width direction of said alternator cover in front view.

10. A shift lever for use with a straddle vehicle comprising:
a body frame;
a footrest on which a rider places his/her foot;
said shift lever being arranged in front of the footrest, and rotated by the rider's operation by foot to shift gears of the vehicle; and
a shift detection mechanism for detecting an operation of the shift lever;
wherein said footrest is supported to a center frame constituting a part of said body frame below a seat of the rider;
said shift detection mechanism is connected to said shift lever, provided in front of said footrest and said center frame, and is supported to a front frame constituting a part of said body frame; and
a rotary shaft of said shift lever is oriented in the longitudinal direction of the vehicle.

11. The straddle vehicle according to claim 10, wherein:
a skid plate for protecting a power unit from dust scattered from a front wheel is provided, in such a manner so as to cover lower faces of said power unit and said body frame; and
said skid plate overlaps with said shift detection mechanism in bottom view.

12. The straddle vehicle according to claim 11, wherein said shift detection mechanism is positioned on the inner side in the vehicle width direction of said skid plate in front view.

13. The straddle vehicle according to claim 10, wherein:
said shift lever extends outward in the vehicle width direction from a connection part with said shift detection mechanism, and then extends rearwardly toward said footrest; and
a protector for protecting said shift detection mechanism is arranged between said shift lever and said shift detection mechanism.

14. The straddle vehicle according to claim 10, wherein said shift detection mechanism is arranged:
below a sprocket cover covering a drive sprocket connected to an output shaft of said power unit;
below an alternator cover covering an alternator that generates electric power inside said power unit;
above said front frame; and
on the side of a lower part of a crankcase of said power unit.

15. The straddle vehicle according to claim 14, wherein said shift detection mechanism is positioned on the inner side in the vehicle width direction of said alternator cover in front view.

* * * * *